(12) United States Patent
Kirtland et al.

(10) Patent No.: US 10,794,463 B2
(45) Date of Patent: Oct. 6, 2020

(54) MOUNTING BRACKET FOR A DRIVE ASSEMBLY

(71) Applicant: Honda Motor Co., Ltd., Tokyo (JP)

(72) Inventors: Dakota D. Kirtland, Dublin, OH (US); Daniel T. Sellars, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 210 days.

(21) Appl. No.: 15/846,477

(22) Filed: Dec. 19, 2017

(65) Prior Publication Data

US 2019/0186614 A1 Jun. 20, 2019

(51) Int. Cl.
*F16H 57/025* (2012.01)
*B60K 17/16* (2006.01)
*F16H 57/037* (2012.01)

(52) U.S. Cl.
CPC ......... *F16H 57/025* (2013.01); *B60K 17/165* (2013.01); *F16H 57/037* (2013.01)

(58) Field of Classification Search
CPC .... B62D 25/2072; B62D 21/02; B62D 21/03; B62D 21/11; B62D 21/155; F16H 57/025; B60K 17/00; B60K 17/22
USPC ......... 248/544, 200, 200.1, 205.1, 300, 674, 248/317, 342, 343, 344; 180/280; 280/495, 727, 124.109
See application file for complete search history.

(56) References Cited

U.S. PATENT DOCUMENTS

| 4,718,582 | A | * | 1/1988 | Iovenitti | B62D 43/02 224/42.21 |
|---|---|---|---|---|---|
| 4,943,092 | A | * | 7/1990 | Haraguchi | B60G 99/004 180/300 |
| 5,855,250 | A | * | 1/1999 | Nishi | B62K 5/01 180/312 |
| 6,533,230 | B2 | * | 3/2003 | Fullenkamp | B60G 13/006 248/300 |
| 7,017,788 | B2 | * | 3/2006 | Trambley | B60R 9/04 224/326 |
| 7,048,286 | B2 | | 5/2006 | Eppelein | |
| 7,770,907 | B2 | | 8/2010 | Shimizu et al. | |
| 7,802,816 | B2 | * | 9/2010 | McGuire | B60G 7/008 180/311 |
| 8,474,844 | B2 | | 7/2013 | Kwon et al. | |
| 8,955,859 | B1 | * | 2/2015 | Richmond | F41H 7/044 280/124.109 |
| 9,238,394 | B2 | | 1/2016 | Leibl | |
| 9,346,492 | B2 | | 5/2016 | Oshima et al. | |
| 10,279,849 | B1 | * | 5/2019 | Kirtland | B62D 25/2072 |
| 10,336,372 | B1 | * | 7/2019 | Upah | B62D 21/02 |

(Continued)

FOREIGN PATENT DOCUMENTS

| CN | 203496594 U | 3/2014 |
|---|---|---|
| EP | 1966029 B1 | 9/2010 |
| WO | 2007080281 A1 | 7/2007 |

*Primary Examiner* — Terrell L McKinnon
*Assistant Examiner* — Michael McDuffie
(74) *Attorney, Agent, or Firm* — American Honda Motor Co., Inc.; Clifford B Vaterlaus (57) ABSTRACT

A bracket for a powertrain component in a vehicle includes a base with a sidewall extending upward and outward from the base, the sidewall including gaps at an upper edge to support frame members of the vehicle upwards from the powertrain component. The sidewall also extends downward from the base to attachment points for suspension members of the vehicle.

20 Claims, 7 Drawing Sheets

(56) References Cited

U.S. PATENT DOCUMENTS

| | | | |
|---|---|---|---|
| 2003/0020325 A1* | 1/2003 | Herbst | B60T 17/043 303/1 |
| 2008/0164386 A1* | 7/2008 | Shapiro | F16C 11/10 248/205.1 |
| 2012/0193163 A1* | 8/2012 | Wimpfheimer | B62D 21/183 180/233 |
| 2015/0034786 A1* | 2/2015 | Huhn | B60N 2/015 248/300 |
| 2015/0061275 A1* | 3/2015 | Deckard | B60K 17/22 280/788 |
| 2016/0075231 A1* | 3/2016 | Mori | B60K 17/24 248/674 |
| 2017/0240208 A1* | 8/2017 | Sandri | B62D 21/11 |
| 2018/0022387 A1* | 1/2018 | Ta | B60L 50/66 180/291 |
| 2018/0257713 A1* | 9/2018 | Faruque | B60K 17/00 |
| 2019/0031011 A1* | 1/2019 | Fujiaki | B62D 21/02 |
| 2019/0061825 A1* | 2/2019 | Nakamura | B62D 21/155 |
| 2019/0185058 A1* | 6/2019 | Kirtland | B60G 7/02 |
| 2019/0202286 A1* | 7/2019 | Natsume | B62D 25/20 |
| 2019/0217894 A1* | 7/2019 | Upah | B60G 3/20 |
| 2019/0375463 A1* | 12/2019 | Upah | B62D 25/088 |

* cited by examiner

MOUNTING BRACKET FOR A DRIVE ASSEMBLY

BACKGROUND

Various components of a vehicle drive assembly are mounted together, including powertrain components, frame members, and suspension members. There is a need to efficiently couple these components in a secure manner that makes assembly and disassembly more convenient.

BRIEF SUMMARY

In accordance with one embodiment of the present disclosure, a bracket for a powertrain component in a vehicle includes a base with a sidewall extending upward and outward from the base, the sidewall including gaps at an upper edge to support frame members of the vehicle upwards from the powertrain component. The sidewall also extends downward from the base to attachment points for suspension members of the vehicle.

In accordance with another embodiment of the present disclosure a bracket includes a base, a first sidewall and a second sidewall. The first sidewall includes a first channel upward from the base at a first end. The first sidewall includes a second channel upward from the base at a second end opposite the first end. The first end of the first sidewall extends downward from the base to a first attachment point for the bracket. The second end of the first sidewall extends downward from the base to a second attachment point for the bracket.

In accordance with yet a further embodiment of the present disclosure, a vehicle bracket assembly is disclosed. The vehicle includes first and second frame members extending in a longitudinal direction of the vehicle. A drivetrain has a powertrain component. A first suspension member is located on one side of the vehicle, and a second suspension member is located on an opposite side of the vehicle. The bracket assembly includes a bracket coupled to the first and second frame members and the first and second suspension members. The bracket is further coupled to the powertrain component such that loads from the first and second frame members and the first and second suspension members are transferred to the powertrain component.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-7, wherein like numbers indicate the same or corresponding elements throughout the views.

Figure 1:
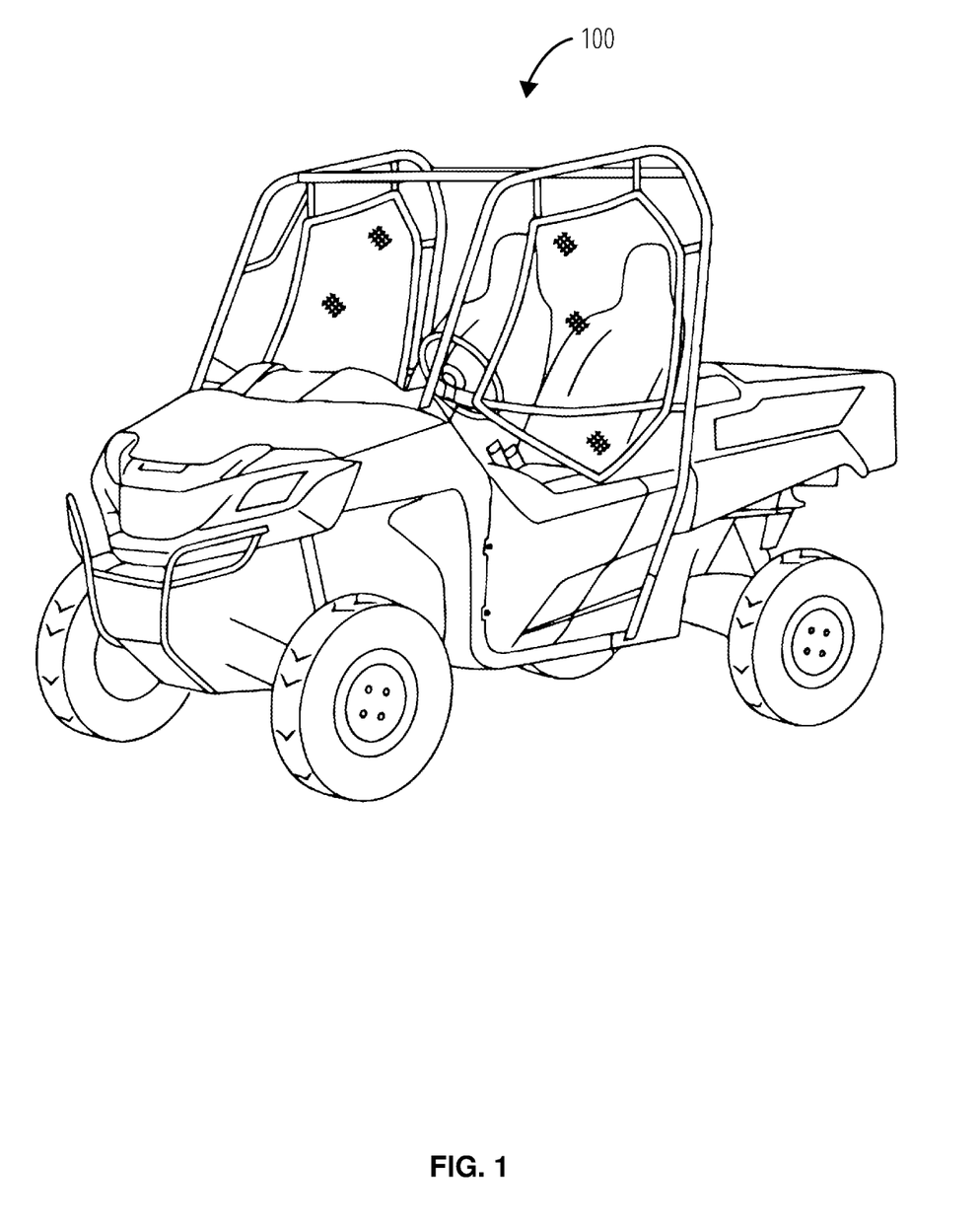
FIG. 1 illustrates an embodiment of an off road vehicle 100.
Figure 2:
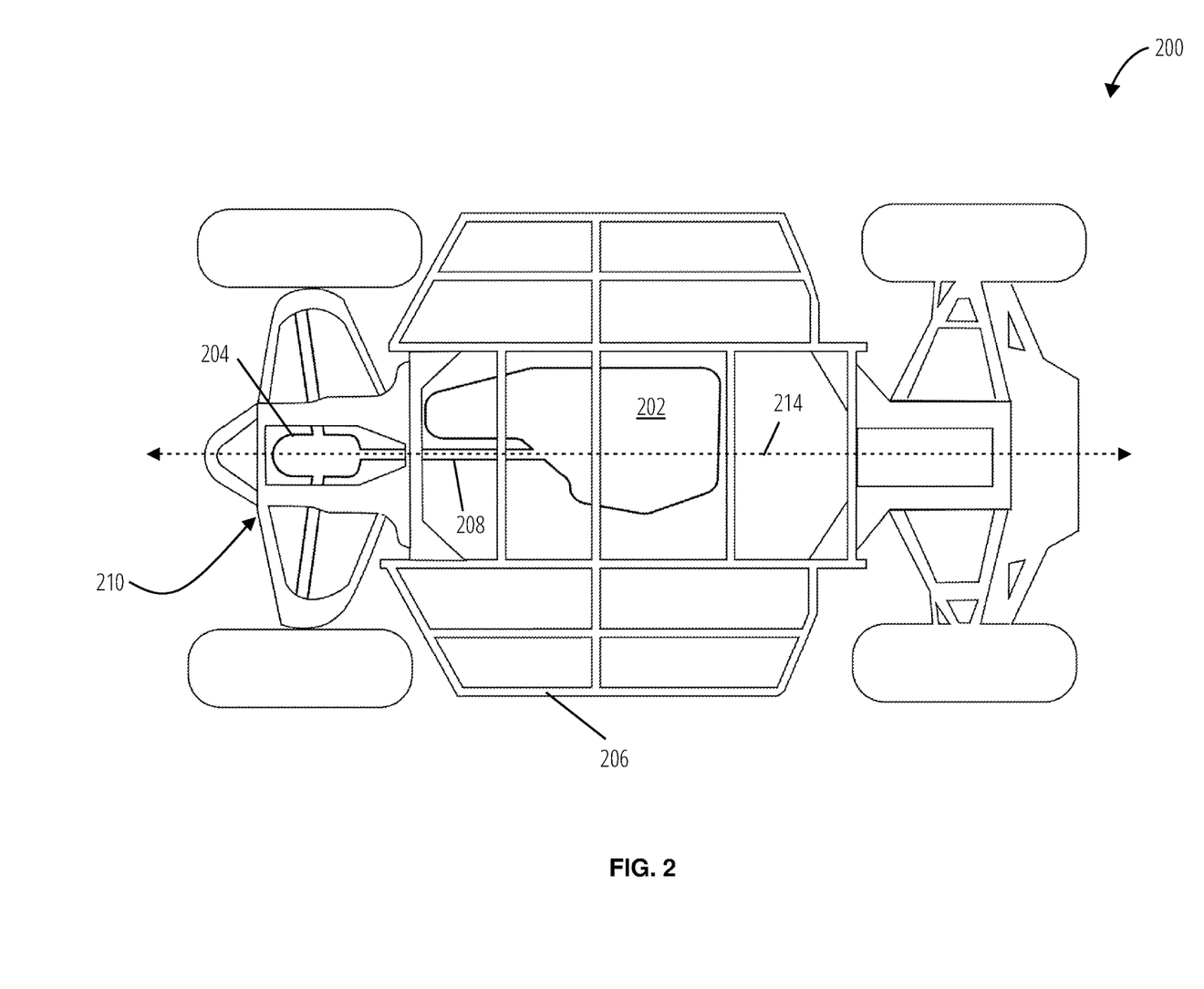
FIG. 2 illustrates a bottom view of a vehicle frame 200 of the off road vehicle 100.

Referring now to the drawings, an off road vehicle 100 is a type of vehicle with high drive torque capacity and long travel suspension. It will be appreciated that the principles of the present disclosure may be applicable to the off road vehicle 100 as well as various other types of vehicles, such as automobiles, trucks, construction or farm equipment, or the like. A vehicle frame 200 of the off road vehicle 100 includes a drive axis 214 traversing a length of a lower frame body 206 centrally through a powertrain component 204 of a drive mounting 210, along a drive shaft 208 as it engages a motor 202 of the off road vehicle 100. The powertrain component 204 maintains narrow mounting points for the suspension such that the width of the off road vehicle 100 is within an acceptable limit and driveshaft angles do not exceed their mechanical limits. It will be understood that the phrase "powertrain component" as used herein shall be construed to include a housing having parts such as an engine, transmission, or gears, including a transaxle, a differential, or a spool that does not allow differentiation of wheel rotation or speed.

Figure 3:
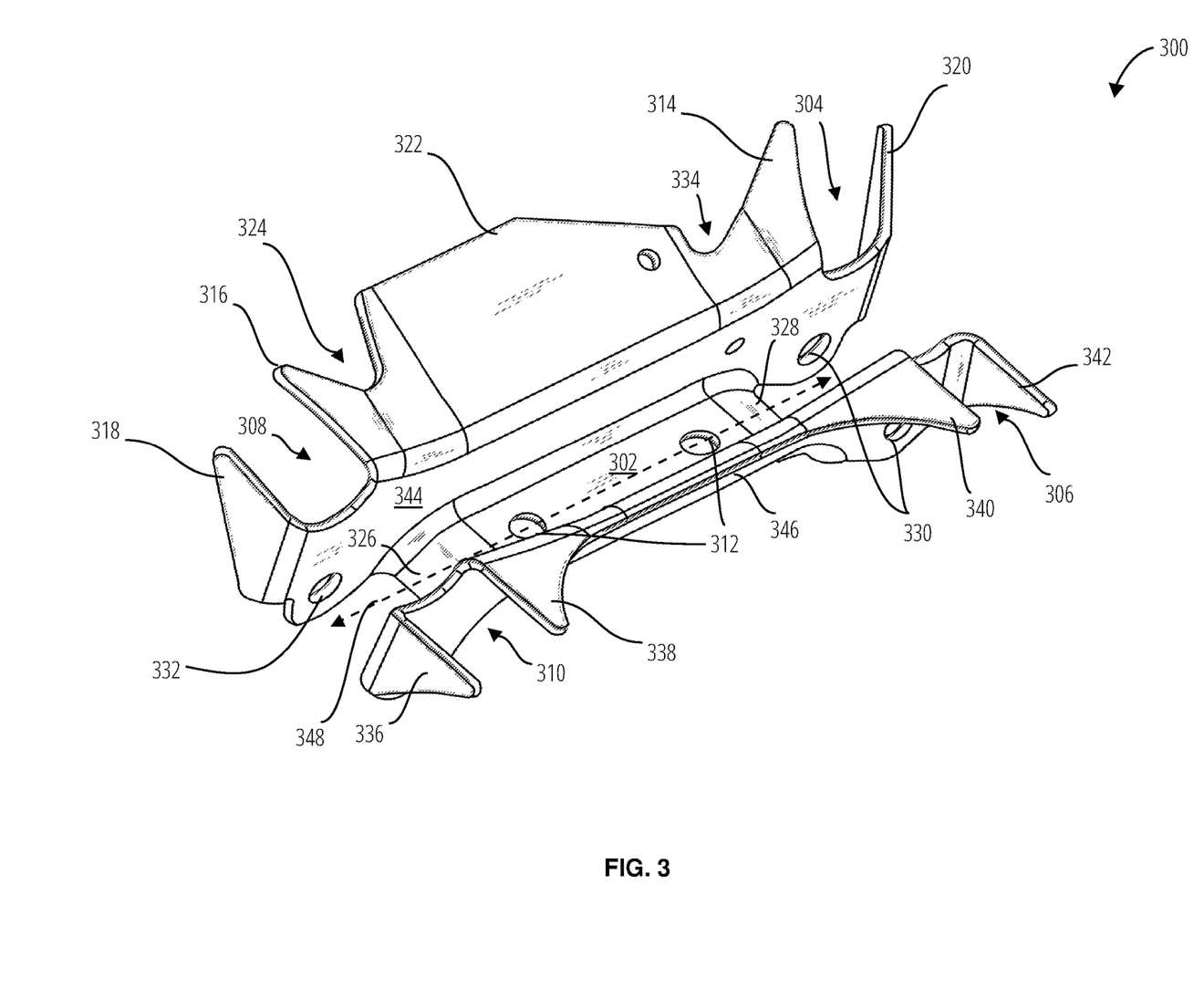
FIG. 3 illustrates a bracket 300 for mounting various drive assembly components of the off road vehicle 100, in accordance with one embodiment.

FIG. 3 illustrates a bracket 300 for mounting various drive assembly components of the off road vehicle 100, in accordance with one embodiment. The bracket 300 may be secured via mounting holes 312 atop the powertrain component 204 to mount to the vehicle frame 200 while additionally mounting suspension components of the off road vehicle 100.

The bracket 300 comprises a base 302 section joining a first sidewall 344 and a second sidewall 346. The sidewall 344 and the sidewall 346 extend past the base 302 on both ends along the long axis centerline 348 of the base 302. Each end of the base 302 is turned downward in a bend 326 and a bend 328. Herein, "downward" means toward the ground when the bracket 300 is mounted on the powertrain component 204 and the wheels of the off road vehicle 100 are on the ground.

The sidewall 344 extends upward from the base 302 and bends outward at an upward inclination. "Upward" herein is the opposite direction of downward, and "outward" means a direction extending away from a long axis centerline 348 of the base 302.

Various protrusions are formed on the upper (most upwards) edge of the sidewall 344. The protrusion 318 and the protrusion 316 create a gap 308 that is aligned upward from one of the linkage holes 332 where the sidewall 344 extends past the bend 326 along the long axis centerline 348. At an opposite end of the sidewall 344, the protrusion 314 and the protrusion 320 form a gap 304 aligned upward from one of the linkage holes 330 where the sidewall 344 extends past the bend 328. Each of the protrusions of the sidewall 344 extend upward and outward from the base 302. Other features of the sidewall 344 include an awning 322, indent 324, and indent 334. The awning 322 may provide a heat shield to insulate wires or cables from exhaust heat. Also, the awning 322 may provide a convenient surface for mounting cables of the powertrain component 204. The indent 324 and indent 334 may provide convenient routing of the cables.

Various protrusions are formed on the upper edge of the sidewall 346. The protrusion 336 and the protrusion 338 form a gap 310 opposite the gap 308 formed on the other sidewall 344. The gap 310 is upward from one of the linkage holes 332. At the other end of the sidewall 346, protrusion 340 and protrusion 342 form a gap 306 opposite the gap 304 in the other sidewall 344. The gap 306 is upwards from one of the linkage holes 330.

Figure 5:
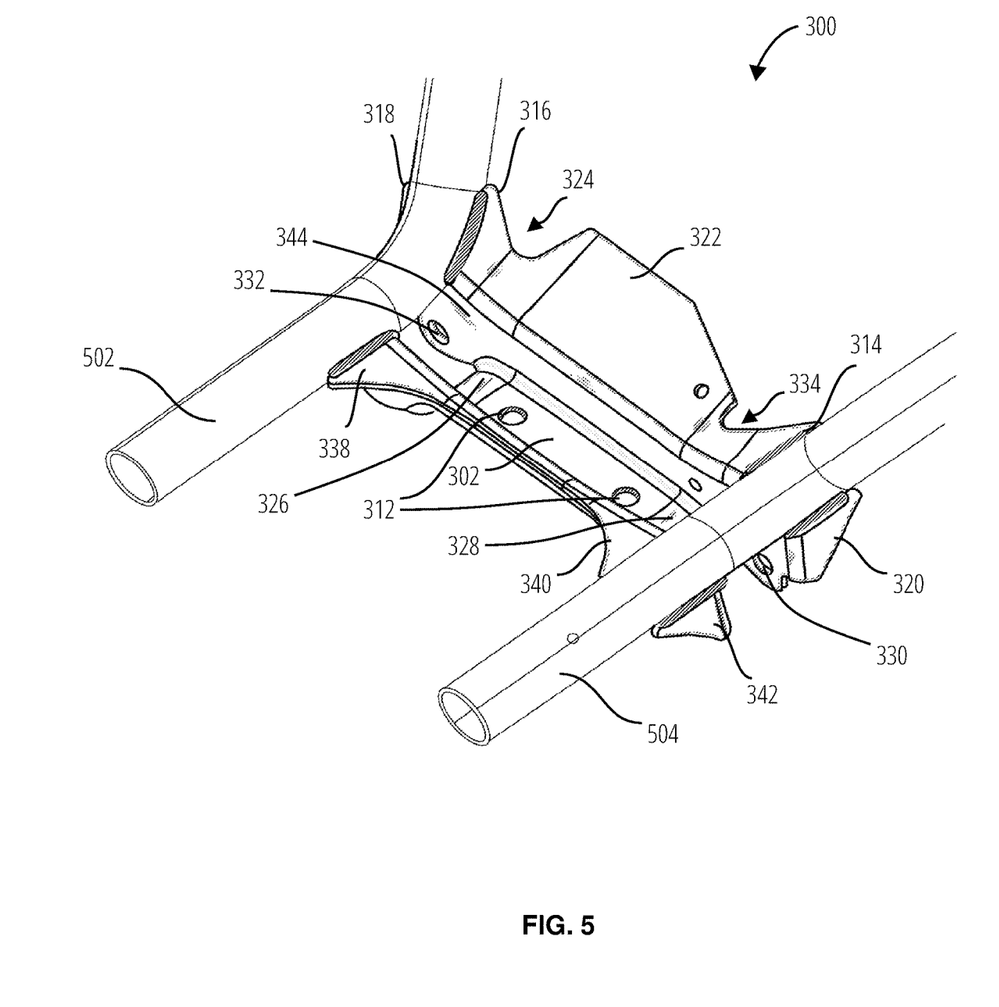
FIG. 5 illustrates the bracket 300 mounting the vehicle frame 200 in accordance with one embodiment.

The gap 308 and gap 310 together receive and support a first upper frame member 502 of the off road vehicle 100. The gap 304 and gap 306 together receive and support a second upper frame member 504 of the off road vehicle 100. FIG. 5 illustrates exemplary weld points between the vehicle frame 200 and the bracket 300.

Figure 4:
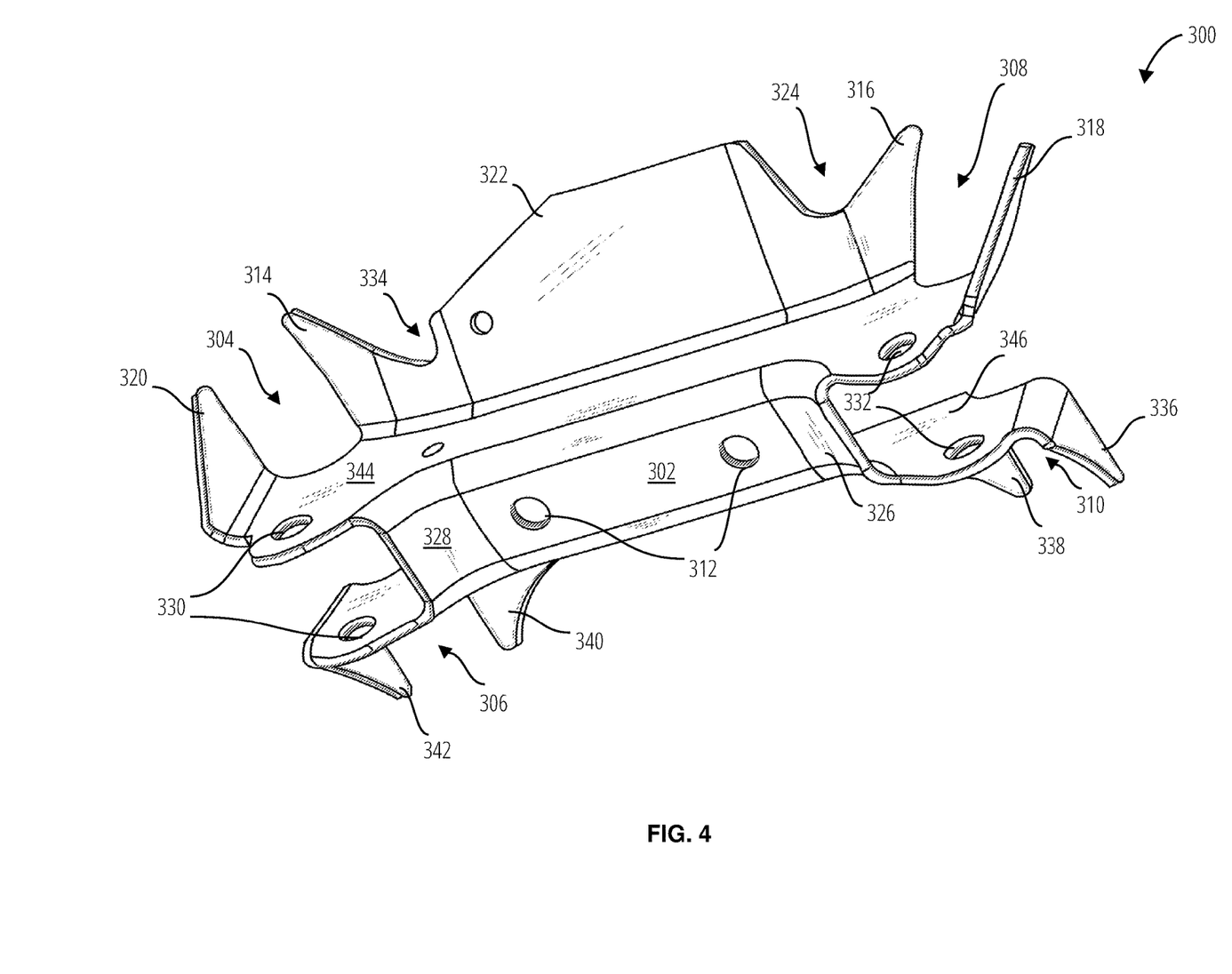
FIG. 4 illustrates a bottom view of the bracket 300 in accordance with one embodiment.

The bracket 300 may be a singular unit (formed from a single piece, not welded or otherwise made of joined components). The base 302 includes one or more mounting holes 312 at attachment points (two in this example) to receive fasteners to couple the bracket 300 to a top of the powertrain component 204. It will be understood that in alternative embodiments, the bracket 300 may be attached to other locations of the powertrain component 204, such as a lower or mid-region, or a front or rear portion of the powertrain component 204. The bracket 300 comprises a sidewall 344 extending upward and outward from the base 302, with gaps (gap 304, gap 308) formed in its upper edge to support the frame members (e.g., first upper frame member 502, second upper frame member 504) of the off road vehicle 100 upwards from the powertrain component 204. The sidewall 344 also extends downward to attachment points (linkage holes 330, linkage holes 332) for the fasteners that couple the bracket 300 to suspension members 706 of the off road vehicle 100.

The bracket 300 also includes a sidewall 346 extending upwards from the base 302 and opposite the sidewall 344 across the long axis centerline 348 of the base 302. The sidewall 346 likewise includes gaps (gap 306, gap 310) at an upper edge, to support the frame members of the vehicle upwards from the powertrain component 204. The sidewall 346 extends downward from the base 302 to linkage holes 330 and linkage holes 332 to further couple the base 302 to the suspension members 706 of the off road vehicle 100.

Each of gap 304 and gap 308 on the top edge of the sidewall 344 is linearly aligned with one of gap 306 and gap 310 on the top edge of the sidewall 346. Each of linkage holes 330 and linkage holes 332 on the different sidewalls are also linearly aligned. The gap 304 and gap 308 on the sidewall 344 may be somewhat more upwards from the base 302 than the gap 306 and gap 310 in the sidewall 346, providing dual support for downwards angled frame members.

Each of the gaps is formed by a pair of protrusions of the respective sidewall. In the illustrated embodiment, each of the gaps is formed by two protrusions (e.g., gap 304 is formed by protrusion 314 and protrusion 320), with each protrusion extending in a substantially orthogonal plane from the other. The protrusions may have a substantially triangular shape, as shown.

The gaps have an extent in three dimensions, and thus may be considered to be channels into which the frame members (e.g., first upper frame member 502 and second upper frame member 504) are received and secured, for example by welding the frame members to the protrusions in the sidewalls that form the channels. The channels are at opposite ends of each sidewall (along the long axis of the base). Each end of each sidewall extends downwards from the base 302 to an attachment point for the bracket 300 to the suspension members 706. Each sidewall also (coextensive with the downward extent) extends beyond the base 302 along the long axis centerline 348 of the base.

Figure 6:
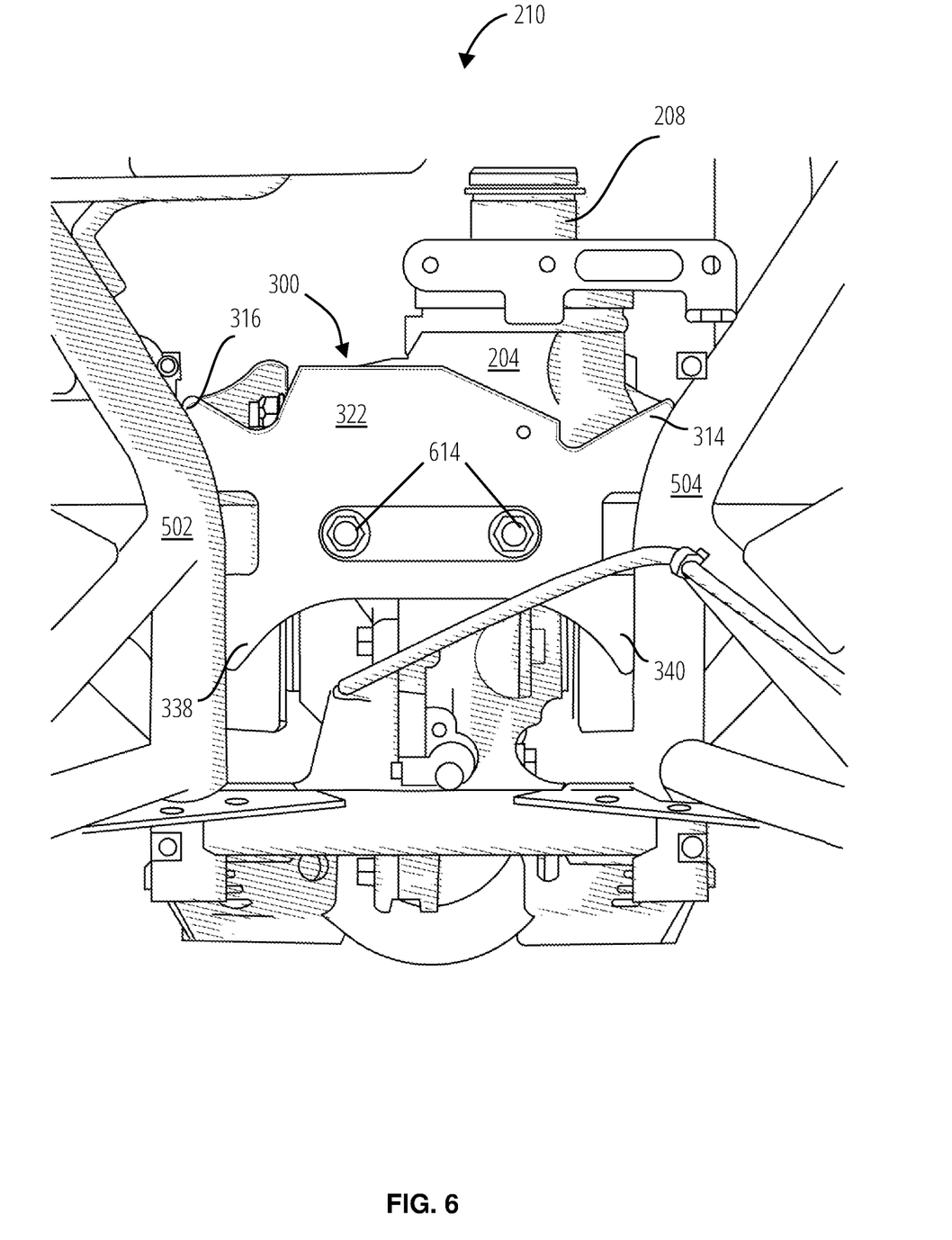
FIG. 6 illustrates top view of an embodiment of the drive mounting 210.

Referencing FIG. 6, an embodiment of the drive mounting 210 is displayed in a top view showing bracket fasteners 614 engaging the powertrain component 204 to the bracket 300 via the mounting holes 312. The bracket 300 elevates and supports the first upper frame member 502 and second upper frame member 504. The first upper frame member 502 is received into the gap 308 and gap 310, and the second upper frame member 504 is received into the gap 304 and the gap 306.

Figure 7:
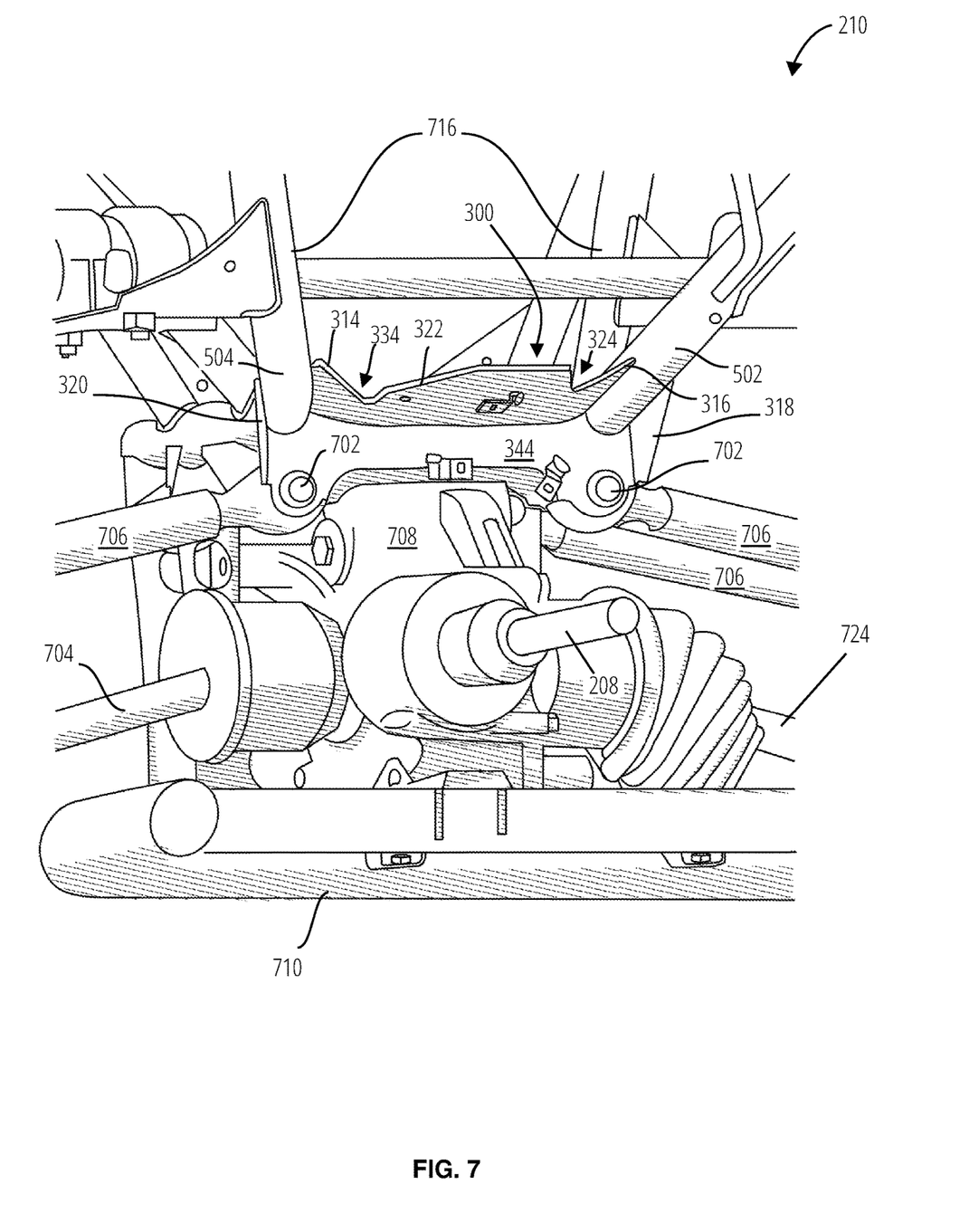
FIG. 7 illustrates a perspective view of an embodiment of the drive mounting 210 with the bracket 300.

Referencing FIG. 7, the drive mounting 210 is positioned upwards from a lower frame body 710 of the off road vehicle 100. The drive mounting 210 is shown with the suspension members 706 pivotably coupled via suspension coupling 702 to the linkage holes 330 and linkage holes 332 of the sidewall 344. The bracket 300 supports the first upper frame member 502 and the second upper frame member 504 of the upper frame body 716 above (upwards of) the powertrain component 708. Maintenance-prone parts such as the couplings and bearings of the drive shaft 208, drive axel 704, and drive axel 724 are easily accessible. Moreover, the bracket 300 provides a singular mount for the upper frame body 716, the suspension members 706 on both sides of the vehicle 100, and the powertrain component 708. Accordingly, the bracket 300 can be coupled to the powertrain component 708 such that loads from the first upper frame member 502 and the second upper frame member 504, and the suspension members 706 on opposite sides of the vehicle 100 can be transferred to the powertrain component 708. Thus, the powertrain component 708 can assist in supporting loads from the upper frame body 716 and the suspension members 706 to provide a sturdy and efficient assembly.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A singular bracket for a powertrain component in a vehicle, the bracket comprising:
   a base comprising one or more first attachment points, the first attachment points of the base to receive fasteners to couple the bracket to the powertrain component;
   a first sidewall extending upward and outward from the base;
   the first sidewall comprising a plurality of first gaps at an upper edge of the first sidewall, the first gaps to support a plurality of frame members of the vehicle upwards from the powertrain component; and the first sidewall extending downward from the base to one or more second attachment points, the second attachment points to receive fasteners to couple the bracket to suspension members of the vehicle;

wherein the base extends along a length having a first end and an opposing second end, wherein the first sidewall extends downward from the base at a location beyond the first end and the second end.

2. The bracket of claim 1, further comprising:

a second sidewall extending upwards from the base, the second sidewall opposite the first sidewall on the base;

the second sidewall comprising a plurality of second gaps at an upper edge of the second sidewall, the second gaps to support the frame members of the vehicle upwards from the powertrain component; and the second sidewall extending downward from the base to one or more third attachment points, the third attachment points to receive fasteners to couple the bracket to the suspension members of the vehicle.

3. The bracket of claim 2, each first gap linearly aligned with a different one of the second gaps.

4. The bracket of claim 2, further comprising:

each second attachment point linearly aligned with a different one of the third attachment points.

5. The bracket of claim 2, the first gaps more upwards from the base than the second gaps.

6. The bracket of claim 1, the first gaps each formed by a pair of protrusions of the first sidewall extending in substantially orthogonal planes.

7. The bracket of claim 6, each of the protrusions having a substantially triangular shape.

8. A bracket comprising:

a base;

a first sidewall and a second sidewall;

the first sidewall comprising a first channel upwards from the base at a first end;

the first sidewall comprising a second channel upwards from the base at a second end opposite the first end;

the first end of the first sidewall extending downwards from the base to a first attachment point for the bracket; and the second end of the first sidewall extending downwards from the base to a second attachment point for the bracket;

wherein the first end of the first sidewall extends beyond the base along a long axis of the base and coextensively downward from the base to the first attachment point.

9. The bracket of claim 8, the second end of the first sidewall extending beyond the base along the long axis of the base and coextensively downward from the base to the second attachment point.

10. The bracket of claim 8, a first end of the second sidewall extending beyond the base along the long axis of the base and coextensively downward from the base to a third attachment point for the bracket.

11. The bracket of claim 10, a second end of the second sidewall extending beyond the base along the long axis of the base and coextensively downward from the base to a fourth attachment point for the bracket.

12. The bracket of claim 10, the third attachment point linearly aligned with the first attachment point.

13. The bracket of claim 11, the fourth attachment point linearly aligned with the second attachment point.

14. A vehicle bracket assembly, the vehicle comprising first and second frame members extending in a longitudinal direction of the vehicle, a drivetrain having a powertrain component, a first suspension member on one side of the vehicle, and a second suspension member on an opposite side of the vehicle, the bracket assembly comprising:

a bracket coupled to the first and second frame members and the first and second suspension members, the bracket further coupled to the powertrain component such that loads from the first and second frame members and the first and second suspension members are transferred to the powertrain component;

wherein the bracket comprises a base having a first sidewall and a second sidewall extending upward and outward from the base, the first sidewall and the second sidewall comprising a plurality of gaps for receiving the first frame member and the second frame member.

15. The vehicle bracket assembly of claim 14, wherein the base extends along a length having a first end and an opposing second end, wherein the first sidewall and the second sidewall extend downward from the base at a location beyond the first end and the second end to form attachment points to couple the first and second suspension members below the base.

16. The bracket of claim 1, further comprising:

a second sidewall extending upward and outward from the base, the second sidewall opposite the first sidewall on the base such that the first sidewall, the base and the second sidewall form a substantial U shape in cross-section with the base on the bottom, and wherein the first attachment points comprise mounting holes in the base.

17. The bracket of claim 8, wherein the first sidewall is positioned opposite the second sidewall with the base on the bottom to form a substantial U shape in cross-section, and wherein the base comprises mounting holes.

18. The bracket of claim 2, the second gaps each formed by a pair of protrusions of the second sidewall extending in substantially orthogonal planes.

19. The bracket of claim 18, each of the protrusions of the second sidewall having a substantially triangular shape.

20. The bracket of claim 8, the first channel linearly aligned with a third channel formed by the second sidewall.

* * * * *